James Anderson's
Pressure Gauge for Water-Backs
of Stoves, Ranges &c.
[104.]
No. 118,506.
Patented Aug. 29, 1871.
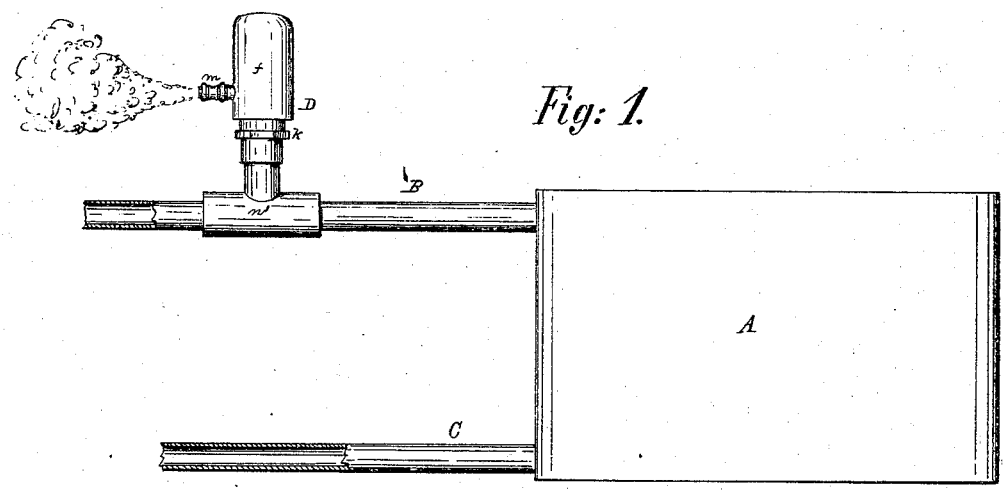
Fig: 1.
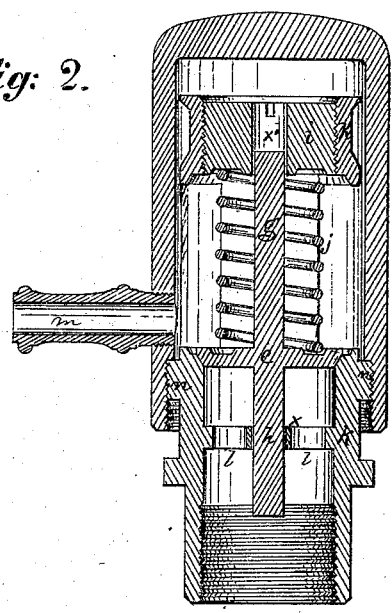
Fig: 2.
Witnesses.
A. C. Johnston
James J. Johnston Jr
Inventor
James Anderson
By J. J. Johnston his attorney

UNITED STATES PATENT OFFICE.

JAMES ANDERSON, OF ALLEGHENY, PENNSYLVANIA.

IMPROVEMENT IN PRESSURE-GAUGES FOR WATER-BACKS OF STOVES, RANGES, &c.

Specification forming part of Letters Patent No. 118,506, dated August 29, 1871.

*To all whom it may concern:*

Be it known that I, JAMES ANDERSON, of Allegheny, in the county of Allegheny and State of Pennsylvania, have invented a new and useful Improvement in Pressure-Gauge for Water-Backs for Stoves, Ranges, &c.

The nature of my invention consists in a pressure-gauge for the water-back of a stove, range, &c., said gauge being constructed as hereinafter described.

To enable others skilled in the art to make and use my invention, I will proceed to describe its construction and operation.

In the accompanying drawing which forms part of my specification, Figure 1 is a side elevation of my improvement, and represents the relation of the pressure-gauge to the water-back. Fig. 2 is a vertical section of the pressure-gauge.

A represents the water-back of a cooking-stove or cooking-range. B and C represent the water-pipes usually connected therewith, which pipes communicate with a boiler or reservoir (known as range-boiler) which supplies the kitchen, bath-room, or part of the house with hot water. The water-back of the cooking-stove and range is often subjected to great pressure by the sudden increase of fire and heat, or by the stoppage or obstruction of the flow of water through the pipes B and C connected with the water-back, and the sudden inlet of water into the water-back by removal of the obstruction in the pipes. This stoppage of the passage of the water in the pipes is most frequent in winter, and is occasioned by the freezing of the water in the pipes; and the thawing of the water in the pipes, giving a free and sudden passage for it into the water-back, when it is heated to a high degree, very often causes an explosion of the water-back, attended with loss of life or injury of person and property. To prevent accidents and relieve the water-back from all sudden and undue strain or pressure I furnish the pipe B with a pressure-gauge, which is constructed as follows: K represents a coupling-pipe or chamber furnished with a valve, $e$, the stems $g$ and $h$ of which move in guides $x$ and $x'$. Around the stem $g$ is placed a spiral spring, $j$, the tension or force of which is regulated by a disk, $i$, which is screwed in the upper end of the coupling-pipe or chamber $k$. The upper part of the coupling-pipe or chamber $k$, with its valve-spring and disk, is covered by a cap, $f$, which is provided with an opening, $m$. The cap $f$ is secured to the coupling-pipe or chamber $k$ at $n$ by means of screw-threads. The lower end of the coupling-pipe or chamber $k$ is provided with screw-threads for the purpose of securing the pressure-gauge as a whole to the T-coupling $n'$ of the pipe B. The pressure-gauge is adjusted to suit the pressure desired for the water-back by screwing the disk $i$ up or down in the coupling-pipe or chamber $k$. The greater the distance is between the the under side of the disk $i$ and top of the valve $e$ the less will be the power of the spring $j$, and the shorter the distance is between the disk and valve the greater will be the power of the spring in holding the valve to its seat. When any undue force is in the water-back the water or steam will press against the under side of the valve, raise it, and allow the surplus force to escape through opening $m$ of the case or cap $f$. The steam or water passes up and against the under side of the valve $e$ through the openings $l$ $l$ of the guide $x$.

What I claim is—

A pressure-gauge for water-back of a stove, range, or other heating apparatus, said gauge consisting of coupling-pipe $k$, valve $e$, spring $j$, adjustable pressure-disk $i$, and cap $f$, constructed, arranged, and operating substantially as herein described, and for the purpose set forth.

JAMES ANDERSON.

Witnesses:
 A. C. JOHNSTON,
 JAMES J. JOHNSTON.